US008676127B2

(12) United States Patent
Stalnacke et al.

(10) Patent No.: US 8,676,127 B2
(45) Date of Patent: Mar. 18, 2014

(54) METHODS AND COMMUNICATION DEVICES IN A RADIO TELECOMMUNICATIONS NETWORK

(75) Inventors: Per-Daniel Stalnacke, Bromma (SE); Peter Rehnberg, Linkoping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 146 days.

(21) Appl. No.: 13/308,932

(22) Filed: Dec. 1, 2011

(65) Prior Publication Data

US 2013/0143612 A1 Jun. 6, 2013

(51) Int. Cl.
*H04B 1/00* (2006.01)

(52) U.S. Cl.
USPC ............ 455/63.1; 455/67.11; 455/114.2; 455/278.1; 375/346

(58) Field of Classification Search
USPC ........... 455/63.1, 67.11, 114.2, 278.1, 296, 455/115.1; 375/346, 348, 144
See application file for complete search history.

(56) References Cited

U.S. PATENT DOCUMENTS

| | | | | |
|---|---|---|---|---|
| 5,857,143 A * | 1/1999 | Kataoka | .......................... | 455/62 |
| 6,167,244 A * | 12/2000 | Tomoe | ........................ | 455/234.1 |
| 6,580,703 B1 * | 6/2003 | Okubo et al. | ................. | 370/335 |
| 7,313,086 B2 * | 12/2007 | Aizawa | .......................... | 370/208 |
| 8,200,263 B2 * | 6/2012 | Wei et al. | ....................... | 455/501 |
| 2012/0249370 A1 * | 10/2012 | Okamoto | ....................... | 342/377 |

OTHER PUBLICATIONS

International Search Report, PCT/SE2009/050643, Mar. 3, 2010.
"Using NetFlow Filtering or Sampling to Select the Network Traffic to Track," Cisco IOS Netflow Configuration Guide, Cisco Systems, San Jose, CA, May 2, 2005, 24 pages.
"NetFlow Services and Applications," Cisco White Paper, Mar. 1, 1999, 27 pages.

* cited by examiner

*Primary Examiner* — Minh D Dao
(74) *Attorney, Agent, or Firm* — Myers Bigel Sibley & Sajovec (57) ABSTRACT

Methods for enabling provision of data to be used in a performance analysis are provided. The communication device obtains an input to set up at least one rule within the communication device to be fulfilled in order to create at least one performance management counter to count occurrences of a performance management parameter related to the communication device. The communication device sets up the at least one rule and detects an impulse. The communication device determines if the at least one rule has been fulfilled. The communication device monitors data associated to the communication device if the at least one rule has been fulfilled, and creates the at least one performance management counter to count occurrences of the at least one performance management parameter based on the monitored data. A message including a result of the at least one performance management counter is transmitted to another device.

12 Claims, 9 Drawing Sheets

METHODS AND COMMUNICATION DEVICES IN A RADIO TELECOMMUNICATIONS NETWORK

CROSS-REFERENCE TO RELATED APPLICATIONS

This application is a §111(a) application and claims priority to PCT International Application No. PCT/SE2009/050643, filed on Jun. 2, 2009, the disclosure and content of which is incorporated by reference herein as if set forth in its entirety.

FIELD

Embodiments herein relate to methods and communication devices in a radio telecommunications network in general, and performance analysis of a communication device in particular.

BACKGROUND

In radio telecommunications networks today, it is important that operators continuously monitor and evaluate performance of a system. Performance information may be gathered in base stations in the system and be reported to an operation and maintenance (O&M) system of the operator for evaluation. In some systems, performance management (PM) counters are used to evaluate the performance of a system. A PM counter may count dropped calls for a circuit switch connection, throughput for a packet data connection, and many other things. In a system using PM counters, the PM counters are the prime source of data when evaluating the performance and trouble shooting the system. The PM counters are hard coded in the base stations of the system. For example, if something "x" occurs in the system, a hard coded counter "PMx" is incremented in the base stations based on a request from an O&M node. Another example is that the throughput, delay or something similar of a connection is measured and that will update certain defined PM counters for that connection.

A problem with the counter technology is that the number of different possible PM counters increases exponentially with the complexity of the system. For example, assume that the operator wants to measure something by the PM counter Pmxyz where $x[1 \ldots l]$, $y[1 \ldots m]$, and $z[1 \ldots n]$ the user defines the different possibilities of a measure entity (Ent) $(x[1 \ldots l], y[1 \ldots m], z[1 \ldots n])$. The Ent may be E-UTRAN Radio access bearer (ERAB) establishment and $x[1 \ldots l]$, $y[1 \ldots m]$, $z[1 \ldots n]$, might be ERAB, Mobile type, Quality of service profile, etc. Then the system must support all possible combinations of x, y and z, i.e. $l*n*m$ PM counters although the actual system at one particular operator is only using a subset of x, y and z. Furthermore, even if the different combinations are known and it is somehow possible to configure the PM counters that shall be used for that particular system, there is still a risk for errors due to incorrect definitions of the PM counters or not updated definitions of the PM counters. Hence, reported result from an erroneous defined PM counter will result in an erroneous performance analysis at the O&M node.

SUMMARY

There is an object of embodiments herein to provide methods and communications devices to enable an efficient and reliable way to perform performance analysis within a radio telecommunications network.

According to a first aspect, the object is achieved by a method in a communication device of a radio telecommunications network is provided for creating at least one performance management counter within the communication device. The at least one performance management counter enables provision of data to be used in a performance analysis. The communication device receives an input to set up at least one rule within the communication device. The rule is to be fulfilled for creating at least one performance management counter to count occurrences of a performance management parameter related to the communication device.

The communication device sets up the at least one rule and detects an impulse and determines whether the at least one rule has been fulfilled based on the impulse. When the at least one rule has been fulfilled the communication device monitors data associated to the communication device and creates the at least one performance management counter to count occurrences of the at least one performance management parameter detected in the monitored data. The communication device then transmits a message comprising a result of the at least one performance management counter to an operation and maintenance communication device.

According to a second aspect, the object is achieved by a communication device arrangement in a communication device. The communication device arrangement comprises an obtaining unit arranged to obtain an input to set up an at least one rule within the communication device. The rule is to be fulfilled in order to create at least one performance management counter to count occurrences of a performance management parameter related to the communication device. The communication device arrangement further comprises a processing unit arranged to set up the at least one rule and a detecting unit arranged to detect an impulse. The impulse is used by the processing unit to determine whether the at least one rule has been fulfilled.

The communication device arrangement furthermore comprises a monitoring unit arranged, in the case the at least one rule is fulfilled, to monitor data associated to the communication device. The communication device arrangement also comprises a counter unit that is arranged to create the at least one performance management counter to count occurrences of the at least one performance management parameter detected in the monitored data. The communication device arrangement further comprises a network interface unit arranged to transmit a result of the at least one performance management counter within a message to an operation and maintenance communication device.

According to a third aspect, the object is achieved by a method in an operation and maintenance communication device for determining performance related to the communication device is disclosed. The operation and maintenance communication device receives a message comprising a result of at least one performance management counter. The result indicates occurrence of a performance management parameter from the communication device.

The operation and maintenance communication device analyses the message by at least one rule for determining that the performance management parameter of the at least one performance management counter is related to a single performance management parameter. The single performance management parameter is defined within the operation and maintenance communication device.

When determined that the at least one performance management counter is related to the single performance management parameter, the operation and maintenance communication device determines performance related to the communication device based on the result received from the communication device in relation to the single performance management parameter.

According to a fourth aspect, the object is achieved by an operation and maintenance arrangement within an operation and maintenance communication device. The operation and maintenance arrangement comprises a network interface unit arranged to receive a message from a communication device. The message comprises a result of at least one performance management counter, which result indicates an occurrence of a performance management parameter.

The operation and maintenance arrangement further comprises a processing unit arranged to analyse the message by at least one rule. The rule is used to determine whether the performance management parameter of the at least one performance management counter is related to a single performance management parameter defined within the operation and maintenance arrangement.

The operation and maintenance arrangement furthermore comprises a performance unit arranged, when determined that the performance management parameter of the at least one performance management counter is related to the single performance management parameter, to determine performance related to the communication device. The performance is based on the result in relation to the single performance management parameter.

Hence, there is no need to hard-code all possible combinations of PM counters in the communication device that might be needed depending of the user setting and the environment of the communication device. The communication device creates PM counter/s based on what it experiences and the communication device will by itself learn which PM counters that it should define and activate. The communication device will always measure relevant things based on what it experiences and not what is predefined i.e. it makes it possible to identify things that are not expected to happen. Thus, a way of creating PM counters for counting relevant performance management parameters is provided resulting in a more efficient and reliable way to perform performance analysis.

BRIEF DESCRIPTION OF THE DRAWINGS

Embodiments will now be described in more detail in relation to the enclosed drawings, in which.

DETAILED DESCRIPTION

Figure 1:
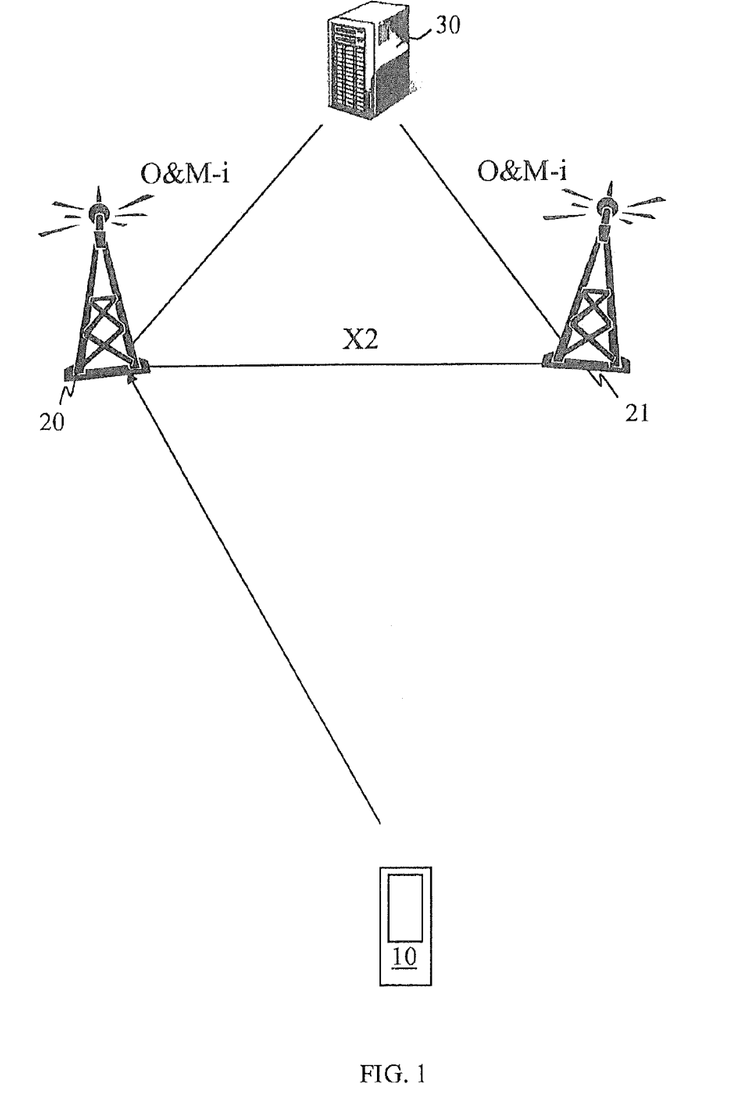
FIG. 1 shows a schematic overview of a radio telecommunications network.

In FIG. 1, a schematic overview of an exemplary embodiment of a radio telecommunications network is shown.

In the illustrated embodiment, an operator via an operation and maintenance (O&M) communication device 30, such as an operational support system node (OSS), determines that a performance analysis should be performed regarding a communication device 20, such as a base station, eNodeB (eNB), NodeB, or any node with a performance management (PM) counter mechanism, within the radio telecommunications network.

The O&M communication device 30 transmits a request to create a type of at least one PM counter to the communication device 20 over a network connection, such as an O&M interface (O&M-i) and/or the like. The PM counter is arranged to count a single PM parameter, which in the example is, ERAB establishments of different Quality of Service class indicators (QCIs).

At the communication device 20, a number of rules has been obtained and set up. A rule implicitly defines one or more PM counters to be generated/created. The rule is activated by a received impulse. In the illustrated example, the communication device 20 comprises a first rule stating that if a received impulse comprises a request to create PM counters for counting ERAB establishments per QCI, a counter for ERAB establishments of the QCI actually used in the communication device 20 should be created. For example, the communication device 20 monitors traffic after the rule has been activated and if ERAB establishments of QCI3, QCI11 and QCI13 are used by traffic in the communication device 20, the corresponding PM counters for ERAB establishments of QCI3, QCI11 and QCI13 will be created. Hence, the communication device 20 will create relevant PM counters in an efficient manner.

When the communication device 20 receives the request from the O&M communication device 30, the communication device 20 determines that the first rule is fulfilled, that is, a request of ERAB establishments per QCI has been received. The communication device 20 then creates PM counters for the relevant classes QCI3, QCI11 and QCI13 used in the traffic associated to the communication device 20. The communication device 20 may further comprise a second rule defining how to name the PM counters, for example, the second rule may state that a PM counter for counting ERAB establishments of a QCIX should be named pmErabEstablQCIX. Hence, in the illustrated example, the communication device 20 names the created PM counters; pmErabEstablQCI3, pmErab EstablQCI11 and pmErabEstablQCI13. It should here be noted that the request may trigger a number of rules at the communication device 20.

The communication device 20 then continuously receives traffic from a UE 10 using radio access bearers of the communication device 20 and monitors the traffic and counts the occurrences of ERAB establishments of QCI3, QCI11, and QCI13 of the traffic using the PM counters pmErabEstablQCI3, pmErab EstablQCI11 and pmErabEstablQCI13.

The communication device 20 then transmits the results of the PM counters pmErabEstablQCI3, pmErabEstablQCI11 and pmErabEstablQCI13 to the O&M communication device 30. A newly created PM counter will be handled as any other PM counter at the communication device and the result will be output from the communication device together with results from any other PM counters after a time period. The time period may be predefined in a general rule set up in the communication device, the rule in the communication device 20, in the request from the O&M communication device 30, and/or the like.

The O&M communication device 30 receives the results of the PM counters pmErabEstablQCI3, pmErabEstablQCI11 and pmErabEstablQCI13 and analyses the results and determines that the counters pmErabEstablQCI3, pmErabEstablQCI11 and pmErabEstablQCI13 relate to the request of the ERAB establishment per QCI. The O&M communication device 30 then uses the results of PM counters pmErabEstablQCI3, pmErabEstablQCI11 and pmErabEstablQCI13 to determine a performance of the communication device 20.

It should be understood that the communication device 20 may comprise a number of other rules. One rule may state that an impulse comprises occurrences of a PM parameter in traffic monitored by the communication device 20. For example, a dropped connection D may generate a PM counter named pmdroppedD.

In other words, based on input from the system and certain rules, the communication device 20 will itself create a PM counter with a certain name. In a more general example, assume that there is something that shall be measured that is triggered by the entity Ent (x[4], y [8], z [2]), the communication device 20 would itself, based on rules, create the PM counter PmEntx4y8z2 and start to use it.

It would also be possible to have a rule saying that the trigger must occur at least a specified number of times until the PM counter is created and activated. For example; if entity Ent(x[4], y [8], z [2]) occurs ten times during a certain defined time, create and start to use the PM counter PmEntx4y8z2.

It is also optional to specify if a PM counter shall "live forever" or if it shall be removed after a certain time of inactivation, that is, the traffic that was previously analyzed and generated the PM counter is no longer present.

It is also possible, based on rules, to make more generic trouble shooting PM counters like PmTrouble_1 . . . X so when problem y occurs, counter PmTrouble_y is generated. This is exemplified above in the PM counter of dropped connection D.

An option could also be that the O&M communication device 30 collecting the results of the PM counters specified on the communication device 20, checks which PM counters that are specified and active on the communication device 20 and makes these PM counters generally available on all communication devices served by the O&M communication device 30. In these embodiments, the O&M communication device 30 may transmit an indication to communication devices 20-21 within a relevant area which PM counters that should be created. Also, the communication device 20 may transmit an indication of specified PM counters to a neighbouring communication device 21 over an X2 connection so that the neigbouring communication device 21 may create relevant PM counters. In this way, the communication device 21 within an area have updated relevant PM counters used in neighbouring traffic and will be efficiently prepared for traffic handed over from the communication device 20.

Hence, in the illustrated example, there is no need to hardcode all possible combinations of PM counters that might be needed depending of the user setting and the environment of the communication device 20. The communication device 20 will by itself learn which PM counters that it should define and activate. The communication device 20 will always measure relevant things based on what it experiences and not what is predefined, e.g. enables the communication device 20 to identify things that are not expected to happen and to count occurrences of such things.

In the illustrated example in FIG. 1, the radio telecommunications network comprises an Evolved Packet System (EPS). However, it should be noted that other radio telecommunications networks may be used, such as Wideband Code Division Multiple Access (WCDMA), and/or the like, and the dynamically creation of PM counters may be performed in any communication device with a PM counter function.

Figure 2:
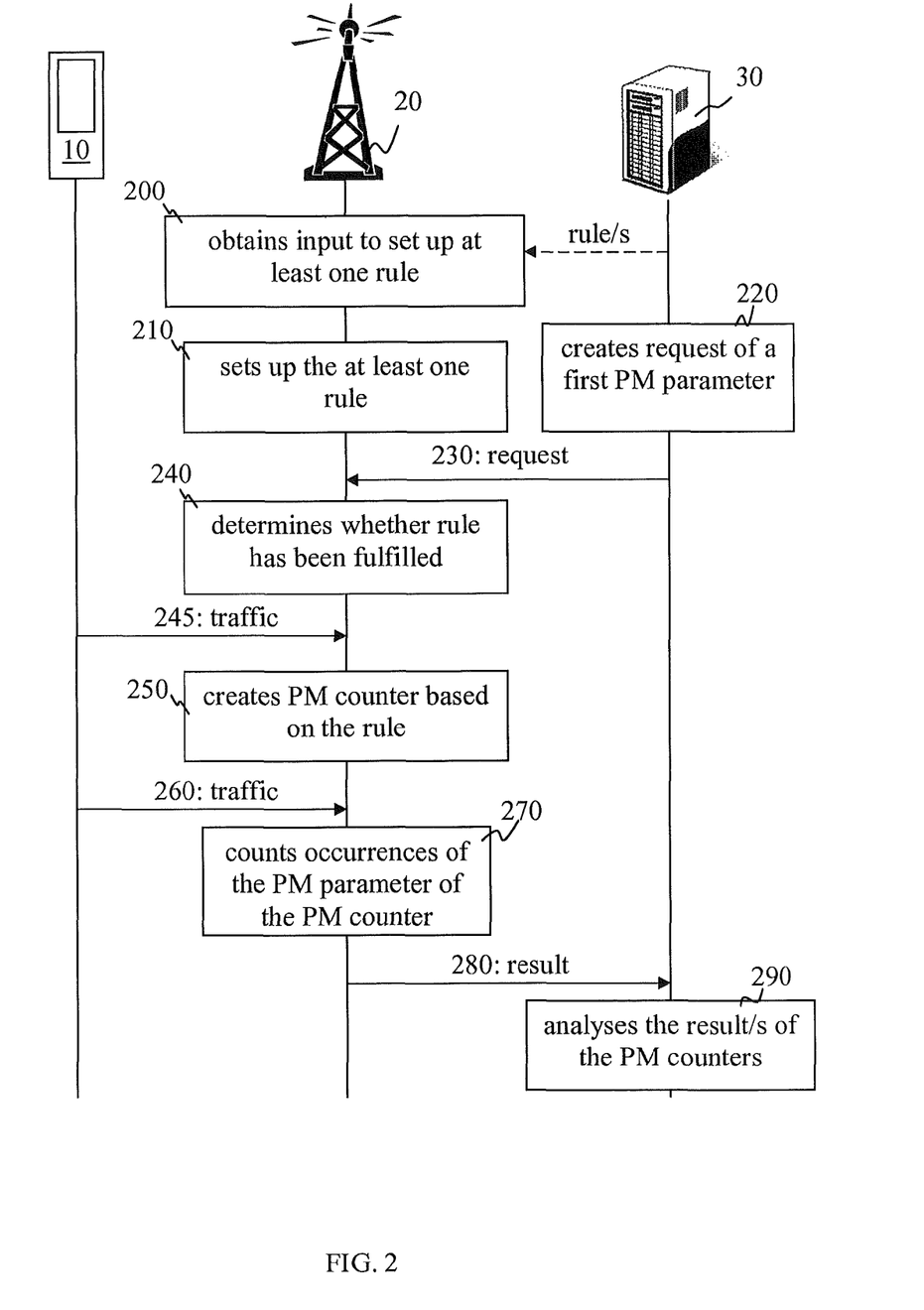
FIG. 2 shows a schematic combined method and signalling scheme in a radio telecommunications network.

FIG. 2 is a combined signaling scheme and flowchart depicting embodiments of the present solution. The method steps do not have to be taken in the order stated below, but may be taken in any suitable order.

In step 200, a rule or a number of rules are obtained in the communication device 20. For the simplicity merely a single rule will be mentioned below. The rule may be input locally at the manufacturing of the communication device 20, manually or, as denoted by a dashed arrow in FIG. 1, transmitted from the O&M communication device 30 to the communication device 20.

In step 210, the communication device 20 sets up the rule within the communication device 20. A rule defines that when a certain condition is met, a certain step is performed by the communication device 20. The certain condition comprises to detect an impulse and the certain step comprises to count at least one performance management (PM) parameter defined implicitly by the rule. That is, the rule does not state the PM parameter to count. Instead, the rule states a step for the communication device 20 to perform in order to retrieve the PM parameter, such as detect occurrences of PM parameters used in the traffic of communication device 20, parameters occurred in internal processes/elements of the communication device 20, and/or the like.

In step 220, an operator of the O&M communication device 30 determines to perform a performance analysis of the communication device 20. The analysis relates to what a single PM parameter the O&M communication device 30 needs to receive information about from the communication device 20. The O&M communication device 30 then creates a request to activate a rule to trigger the creation and activation of PM counters based on the underlying traffic passing the communication device 20.

The rule that is activated may be constructed to create counters that can be identified by the single PM parameter such as Core Network Identifier, E-UTRAN Radio Access Bearer (ERAB) of different QCIs, internal alarms and/or the like. The single PM parameter may be preset by the operator of the O&M communication device 30.

In step 230, the O&M communication device 30 then transmits the request to the communication device 20.

In step 240, the communication device 20 receives the request and determines whether a rule has been fulfilled. For example, the condition for the rule to be fulfilled comprises that the communication device 20 requires to receive an impulse. The impulse comprises a request for counting the single PM parameter has been received. As the communication device 20 has received the request, the rule is determined to have been fulfilled and the rule is activated.

In step 245, the communication device 20 receives, transmits and monitors traffic to and from at least one UE 10 served by the communication device 20.

In step 250, the communication device 20 creates one or more PM counters in accordance with what is implicitly defined by the activated rule. The activated rule implicitly defines, when fulfilled, one or a number of PM counters related to the single PM parameter. The PM counter may be created to count an occurrence of a defined entity or measure the performance of the communication device 20 related to the single PM parameter. Implicitly herein implies that the communication device 20 shall, based on monitoring of received traffic or internal processes of the communication device 20, create PM counters of PM parameters detected during the monitoring. In other words, the communication device 20 comprises a dynamical PM counter generation or creation technique that is based on predetermined rules.

The communication device 20 may also comprise a second rule defining how to name the PM counter/s. The second rule may state that a PM counter is named after what PM parameter the PM counter counts. This way of naming the PM counters will facilitate the process of defining PM parameter of the PM counter at the O&M communication device 30, when the results are reported back to the O&M communication device 30. The results are defined by the name of the PM counter.

In step 260, the communication device 20 continues to receive and transmit traffic to and from at least one connected UE 10.

In step 270, the named PM counter of the communication device 20 counts the occurrences of the PM parameter of the PM counter in the traffic. Hence, the communication device 20 registers a result of each PM counter, for example, during a time period indicated in the request, in the first rule or in a different rule.

In step 280, the communication device 20 transmits a message comprising the result/s of the PM counter/s back to the O&M communication device 30.

In step 290, the O&M communication device 30 receives the message and analyses the result of the PM counter from the communication device 20. The O&M communication device 30 may comprise a transforming rule that states that certain PM counters relate to a certain requested PM parameter. For example, if the O&M communication device 30 receives and analyses a result of a PM counter named pmQCI15, the O&M communication device 30 may comprise a rule that understands the name as a definition that the result come from a QCI counter. The O&M communication device 30 then uses this to determine performance of the communication device 20 of cells, traffic, and/or UEs related to the communication device 20. Hence, an efficient and reliable way to perform performance analysis is obtained.

Figure 3:
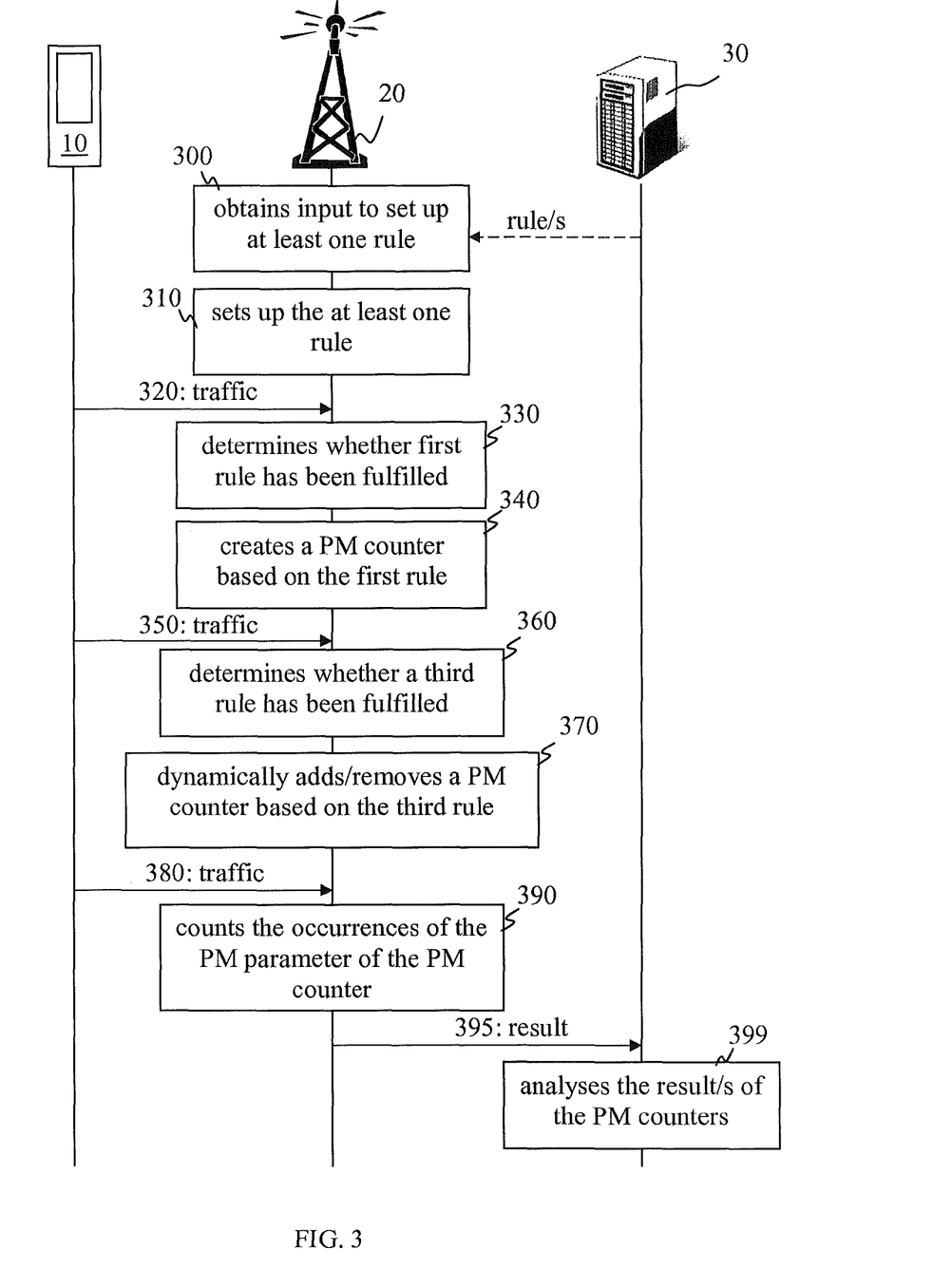
FIG. 3 shows a schematic combined method and signalling scheme in a radio telecommunications network.

FIG. 3 is a combined signaling scheme and flowchart depicting further embodiments of the present solution. The method steps do not have to be taken in the order stated below, but may be taken in any suitable order.

In step 300, a rule is obtained by the communication device 20. The rule may be input locally at the manufacturing of the communication device 20, manually, received from the O&M communication device 30 as indicated by the dashed arrow in the FIG. 3, and/or the like. This is performed as in step 200 in FIG. 2.

In step 310, the communication device 20 sets up the rule within the communication device 20. This is performed in a similar way as in step 210 of FIG. 2.

In step 320, the communication device 20 receives traffic from at least one UE 10 served by the communication device 20 and the communication device 20 monitors the traffic.

In step 330, the communication device 20 determines whether a first rule has been fulfilled. This step is performed in accordance with step 220. In the illustrated example, the communication device 20 has set up a first rule that uses occurrences of different events monitored in the traffic as an impulse to trigger the rule. For example, occurrence of a dropped connection over a certain radio access bearer may trigger a rule stating that the communication device 20 should create a PM counter counting occurrences of dropped connections of that ERAB. The first rule, hence, states that based on what the communication device 20 experiences in the monitored traffic the communication device 20 should create a relevant PM counter.

It should here be understood that a rule may state that if the communication device 20 detects no traffic over an ERAB during a predetermined time the communication device 20 should create a PM counter counting how long no traffic is sent over the ERAB. For example, the rule may state that if no access to a cell of the communication device 20 has been made for more than sixty minutes then the communication device 20 should create PM counter pmNoacces and increase the counter for each fifteen minute period without traffic.

Another example of a rule may be a rule indicating the creation of a PM counter when an alarm within the communication device 20, relating to software or hardware failure, is triggered. The PM counter will then count occurrences of the alarm. The operator may specify number of alarms of a certain type during a predetermined time for the rule to be considered fulfilled.

In step 340, the communication device 20 creates the PM counter based on the first rule. The communication device 20 may also comprise a second rule defining have to name the PM counter. The second rule may state that a PM counter is named after what PM parameter the PM counter counts. For example, in case the PM parameter comprises a dropped ERAB R the PM counter is named pmDroppedR. The step 340 in FIG. 3 corresponds to step 250 in FIG. 2.

In step 350, the communication device 20 receives and monitors traffic from one or more UEs 10 served by the communication device 20 during a time period. The time period may be specified in the first rule, preset in the communication device 20 as a general rule and/or the like.

In step 360, the communication device 20 determines whether a third rule has been fulfilled. For example, a third rule may state that if the traffic changes so that a previously created PM counter is no longer relevant, the PM counter relating to that traffic should be removed. This may be the case when the traffic relating to that PM counter has not been present or active during a predetermined period of time, such as a number of days or hours. In the illustrated example, traffic relating to a previously created PM counter is no longer active and the third rule is fulfilled.

In step 370, the communication device 20 then dynamically changes the number of PM counters based on the fulfilled third rule. In the example, the communication device 20 removes the PM counter that is no longer relevant according to the fulfilled third rule.

In step 380, the communication device 20 continues to receive and monitor traffic from at least one UE 10 served by the communication device 20.

In step 390, the still relevant PM counter/s of the communication device 20 counts the occurrences of the respective PM parameter, in the monitored traffic and the result of the PM counter/s is registered. This is performed as in the step 270 in FIG. 2.

In step 395, the communication device 20 then transmits the result of each PM counter in a message back to the O&M communication device 30. This is performed as in the step 280 in FIG. 2.

In step 399, the O&M communication device 30 receives and analyses the result/s from the communication device 20. The O&M communication device 30 may comprise a transforming rule that states that certain PM counters relate to a certain requested PM parameter. For example, if the O&M communication device 30 receives and analyses a result of a counter named pmDroppedR, the O&M communication device 30 will determine that the counter relates to dropped connections and use this to determine performance of the communication device 20, cells and/or connections related to the communication device 20. This is performed in accordance with what is stated in step 290 in FIG. 2.

The above mentioned examples result, as stated above, in that there is no need to hard-code all possible combinations of PM counters in the communication device 20 that might be needed depending of the user setting and the environment of the communication device 20. The communication device 20 creates PM counters based on what it experiences/monitors, thus, the communication device 20 will by itself learn which PM counters that it should define and activate. The communication device 20 will then measure relevant things based on what it experiences and not what is predefined i.e. it makes it possible to identify things that are not expected to happen. Hence, a way of creating PM counters for counting relevant PM parameters is provided resulting in a more efficient and reliable way to perform performance analysis.

Figure 4:
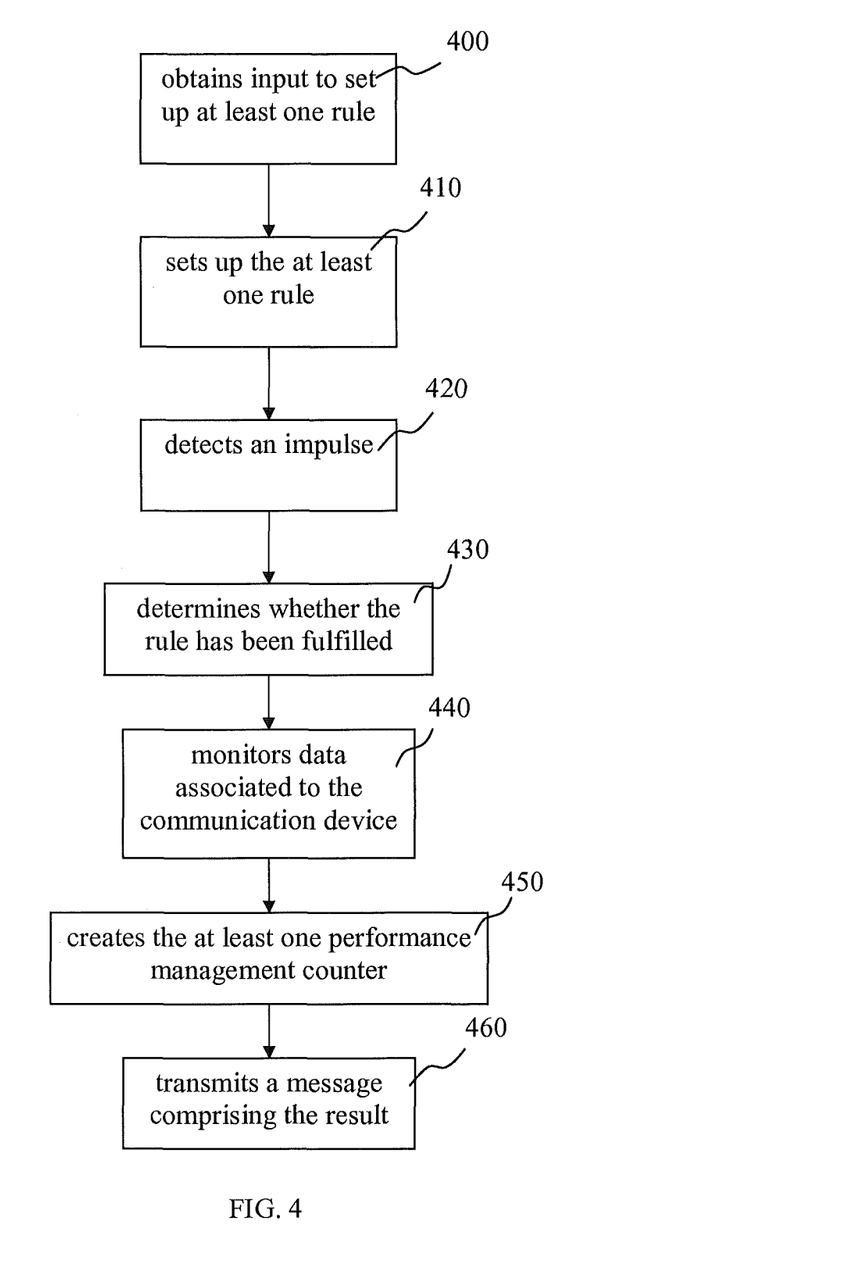
FIG. 4 shows a schematic overview of a flowchart of a method in a communication device.

The method steps in the communication device 20 for enabling the provision of PM data to be used in a performance analysis related to the communication device 20 according to some general embodiments will now be described with reference to a flowchart depicted in FIG. 4. As mentioned above the communication device 20 may comprise a base station, such as an eNB, NB, or any node with a performance management (PM) counter mechanism. The method steps do not have to be taken in the order stated below, but may be taken in any suitable order.

In step 400, the communication device 20 obtains an input to set up at least one rule within the communication device 20. The at least one rule is to be fulfilled in order for the communication device 20 to create at least one PM counter. The PM counter is arranged to count occurrences of a PM parameter related to the communication device 20.

In step 410, the communication device 20 sets up the at least one rule. It should here be noted that the communication device 20 may comprise a number of set up rules.

In step 420, the communication device 20 detects an impulse. The impulse may comprise a request from an O&M communication device; traffic to/from at least one user equipment served by the communication device 20, an alarm of an internal process of the communication device 20, and/or the like. The impulse may in fact comprise an indication of no data. For example, if no sent data on an ERAB is detected a PM counter may be created counting time periods when the ERAB is not used.

In step 430, the communication device 20 determines whether the at least one rule has been fulfilled. For example, in order to fulfil the at least one rule a certain condition has to be met. The certain condition comprises to detect a certain impulse. That is, the at least one rule need to receive an impulse as activation input to be fulfilled. Based on the type of impulse, such as an alarm, event of traffic, request and/or the like, and the information, such as QCI, SW failure and/or the like, of the impulse, the communication device 20 determines whether the at least one rule has been fulfilled or not.

In step 440, wherein the at least one rule has been fulfilled, the communication device 20 monitors data associated with the communication device, wherein the communication device detects occurrences of a PM parameter.

In step 450, the communication device 20 creates the at least one PM counter to count occurrences of the at least one PM parameter in accordance with what is detected in the monitored data.

In step 470, the communication device 20 transmits a message comprising a result of the at least one PM counter to the O&M communication device 30.

Figure 5:
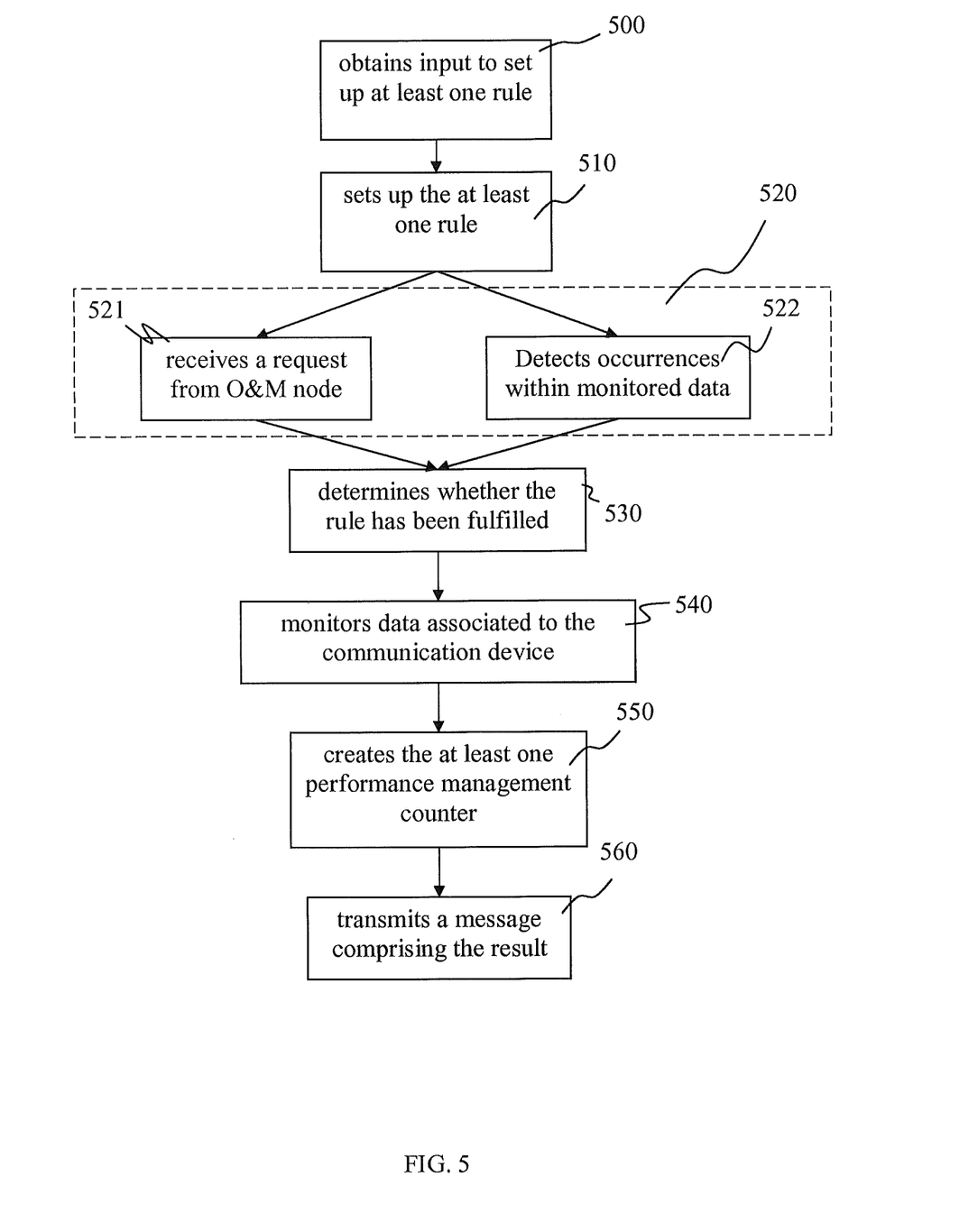
FIG. 5 shows a schematic overview of a flowchart of a method in a communication device.

In FIG. 5, a method in the communication device 20 according to some embodiments of the present solution is shown.

In step 500, the communication device 20 obtains an input to set up at least one rule within the communication device 20. The rule is to be fulfilled in order for the communication device 20 to, by itself, create at least one performance management (PM) counter. The PM counter is arranged to count occurrences of a PM parameter related to the communication device 20. The step 500 in FIG. 5 corresponds to step 400 in FIG. 4.

In step 510, the communication device 20 sets up the at least one rule. It should here be noted that the communication device 20 may comprise a number of set up rules. The step 510 in FIG. 5 corresponds to step 410 in FIG. 4.

In step 520, the communication device 20 detects an impulse. The impulse may comprise different types of signals or events, such as a received request for creating a counter from a O&M communication device 30, an occurrence of an event in received traffic from a UE served by the communication device 20, an occurrence of a situation in hardware or software within the communication device 20, and/or the like. The step 520 in FIG. 5 corresponds to step 420 in FIG. 4.

In step 521, illustrated as an example of step 520, the communication device 20 may detect an impulse comprising a request from the O&M communication device 30. The communication device 20 may also detect an impulse, as stated in alternative step 522, illustrated as another example of step 520, comprising data associated to the communication device 20 also defined as occurrences of events or situations within monitored data related to the communication device 20.

In step 530, the communication device 20 determines whether the at least one rule has been fulfilled based on the detected impulse. In order to fulfil a rule a certain criterion has to be fulfilled; that is, a certain impulse has to be detected. The step 530 in FIG. 5 corresponds to step 430 in FIG. 4.

The at least one rule receives an impulse as an activator; a trigger of the at least one rule. Based on the impulse the communication device 20 determines whether the rule has been fulfilled or not. As stated above, the impulse may comprise different types of signals and/or events.

In some embodiments, the impulse comprises a request from the O&M communication device 30, being a request for counting occurrences of a single PM parameter. The at least one rule, set up in the communication device 20, may state that if a request for counting occurrences of the single PM parameter is received, at least one PM counter should be created counting occurrences of a PM parameter detected in the monitored data associated to the single PM parameter.

It should here be noted that the rule may state that when a request is received of a single PM parameter the communication device 20 should monitor received traffic and based on the monitoring create PM counters relevant to the monitored traffic.

A PM parameter may comprise a, Quality of service Class Identifier, Core Network Identifier, E-UTRAN Radio Access Bearer, International Mobile Subscriber Identity, mobile type, and/or the like.

Another example; the impulse comprises data related to the communication device 20, as stated in 522, for example, traffic received from at least one UE connected to the communication device 20. A rule may state that if a certain event occurs in traffic received from UEs, a PM counter should be created for counting such events. The at least one rule may further state to create a PM counter to count occurrences of a PM parameter detected in the monitored data that has occurred during a predetermined time period and/or a preset number of times.

The event of the traffic may comprise occurrence of an ERAB establishment of used QCI classes, a dropped connection, a certain low throughput of an ERAB and/or the like. The event may also comprise a lack of traffic/traffic event. For example, a rule may state that, if no occurrence of an event of a previously created PM counter has reoccurred during a predetermined time period, the previously created PM counter should be removed. Hence, the communication device 20 dynamically creates PM counters. In some embodiment, the event comprises the lack of traffic, and the rule may state that if no traffic has been received a PM counter may be created for counting the time of lacking traffic. Hence, a rule may state that a PM parameter that has not occurred in the monitored data during a predetermined time or occurred a number of times but the number is under a preset threshold during a predetermined time, the counter of such a PM parameter should be removed.

The impulse may also comprise an event within the communication device 20, such as an alarm of a software/hardware failure within the communication device 20. Thus, the impulse may comprise at least one occurrence of a PM parameter in received traffic or internal processes of the communication device 20.

In step 540, when the at least one rule has been fulfilled, the communication device 20 monitors data associated to the communication device and detects occurrences in the data to determine PM parameters to count. The data may comprise data of traffic served by the communication device 20, data of internal process of the communication device 20 and/or the like. The step 540 in FIG. 5 corresponds to step 440 in FIG. 4.

In step 550, the communication device 20 creates the at least one PM counter to count occurrences of the at least one PM parameter detected in the monitored data. Hence, means are provided not to hard code PM counters but in a flexible way create PM counters internally, that is, the communication device 20 intelligently creates PM counters based on monitored data related to the communication device 20. The at least one rule defines implicitly the PM counters by stating what the communication device should monitor and base its creation of PM counters. For example, the at least one rule defines the data for the communication device 20 to monitor, such as data relating to internal processes, data relating to traffic, and/or the like. Thus, the communication device 20 monitors the defined data within the communication device and based on detection of occurrences of relevant events, defined by the rule, within the monitored data creates relevant PM counters. The step 550 in FIG. 5 corresponds to step 450 in FIG. 4.

Hence, the communication device 20 creates PM counters based on what it experiences; the communication device 20 will by itself detect which counters that it should define and activate. The communication device 20 will then always measure relevant things based on what it experiences and not what is predefined i.e. it makes it possible to identify things that are not expected to happen. Hence, a way of creating PM counters for counting relevant PM parameters is provided resulting in a more efficient and reliable way to perform performance analysis.

In step 560, the communication device 20 transmits a message comprising a result of the at least one PM counter to the O&M communication device 30. The result indicates the number of occurrences of a PM parameter. It should here be noted that the result may indicate that no occurrences has been registered. In some embodiments, the message further comprises a definition of the PM parameter that has been counted. The definition may comprises a name, composed by combining a definition of the single PM parameter and the PM parameter that has been counted based on a predetermined rule. The step 560 of FIG. 5 corresponds to the step 460 of FIG. 4.

In some embodiments, a second rule set up in the communication device 20 may state how to define a definition of the message. The definition comprises a PM parameter that has been counted according to the second rule. The name may facilitate the way of the O&M communication device 30 to analyse the result from the communication device 20. For example, an operator wants to count ERAB establishment for each QCI in the communication device 20 but the O&M communication device 30 does not know which QCIs that are used in the communication device 20. If the traffic in the communication device 20 is monitored by the communication device 20 and determined to comprise ERAB establishments of QCI2, QCI17 and QCI45, then PM counters named pmErabestablishmentQCI2, pmErabestablishmentQCI17 and pmErabestablishmentQCI45 are automatically created. Today 256 QCIs exist, however, if the number of QCIs is increased to 512 QCIs a new code in the communication device 20 is not needed to define the new QCIs but instead, based on the same rules, a PM counter may be created and named also for QC's 256-512.

Figure 6:
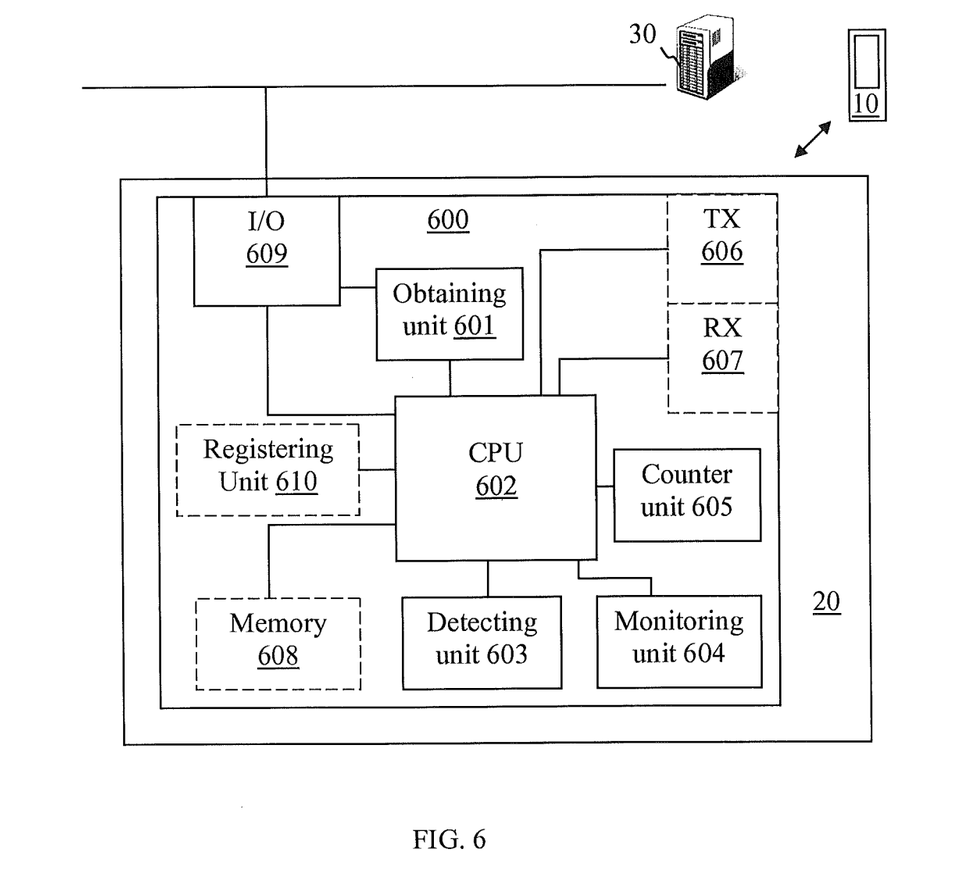
FIG. 6 shows a schematic overview of a communication device comprising an arrangement.

To perform the method steps above for enabling the provision of PM data to be used in a performance analysis related to the communication device 20, the communication device 20 comprises an arrangement 600 depicted in FIG. 6.

The communication device arrangement 600 comprises an obtaining unit 601 arranged to obtain an input of at least one rule set up at least one rule within the communication device 20. The at least one rule is to be fulfilled for creating at least one PM counter to count occurrences of a PM parameter related to the communication device 20.

The communication device arrangement 600 further comprises a processing unit 602 arranged to set up the at least one rule, and also a detection unit 603 arranged to detect an impulse. The processing unit 602 is further arranged to determine whether the at least one rule has been fulfilled based on the impulse.

Furthermore, the communication device arrangement 600 comprises a monitoring unit 604 arranged to, when the at least one rule has been fulfilled, monitor data associated to the communication device 20. The data may comprise data of traffic served by the communication device 20, data of internal process of the communication device 20 and/or the like. The communication device arrangement 600 further comprises a counter unit 605 that is arranged to create the at least one PM counter to count occurrences of the at least one PM parameter detected in the monitored data.

The communication device arrangement 600 may further comprise a transmission unit (TX) 606 and a receiving unit (RX) 607. TX 606 and RX 607 are arranged to receive and transmit data packets/signals, that is, traffic, to and from user equipment 10 served by the communication device 20.

In some embodiments, the impulse comprises different types of signals/events, such as, a received request for creating a counter from the O&M communication device 30 over a network interface unit (I/O) 609, an occurrence of an event in received traffic over the RX 607, an occurrence of an event in hardware or software within the communication device 20, and/or the like.

A result of the at least one PM counter is transmitted within a message over the I/O 609 to the O&M communication device 30. In some embodiments, the communication device arrangement 600 may furthermore comprise a registering unit 610 arranged to register the result of the at least one PM counter. The result may be indicating a zero result if no occurrences has been detected.

In some embodiments, the message comprises a definition of the PM parameter that has been counted. The definition may comprises a name, composed by combining a definition of the single PM parameter and the PM parameter that has been counted based on a predetermined rule set up in the processing unit 602.

The communication device arrangement 600 may further comprise a memory unit 608 to be used to store data regarding set up rules, received traffic, internal processes, definitions, and applications to perform the methods of this solution.

The memory unit 608 may comprise a single memory unit, a plurality of memory units, external and/or internal memory units.

The processing unit 602 may comprise a CPU (as illustrated), a single processing unit, a plurality of processing units, and or the like. It should also be understood that the input unit 601, the detection unit 603, monitoring unit 604, the counter unit 605, and/or registering unit 610 may all be parts of a processing unit.

PM parameters may comprise Quality of Service Class identifier, Core Network Identifier, Evolved Universal Terrestrial Radio Access Network Radio Access Bearer (ERAB) establishments of different Quality of Service Class identifier. In WCDMA, where a base station knows the International Mobile Subscriber Identity (IMSI) of UEs one could create PM counters for each and every UE, groups of UEs or certain specific IMSIs of UEs.

It should be understood that QCI is used by communication devices 20 to control bearer level packet forwarding treatment, for example, admission threshold values, queue management threshold values and/or the like. These may be specified by the operator.

Figure 7:
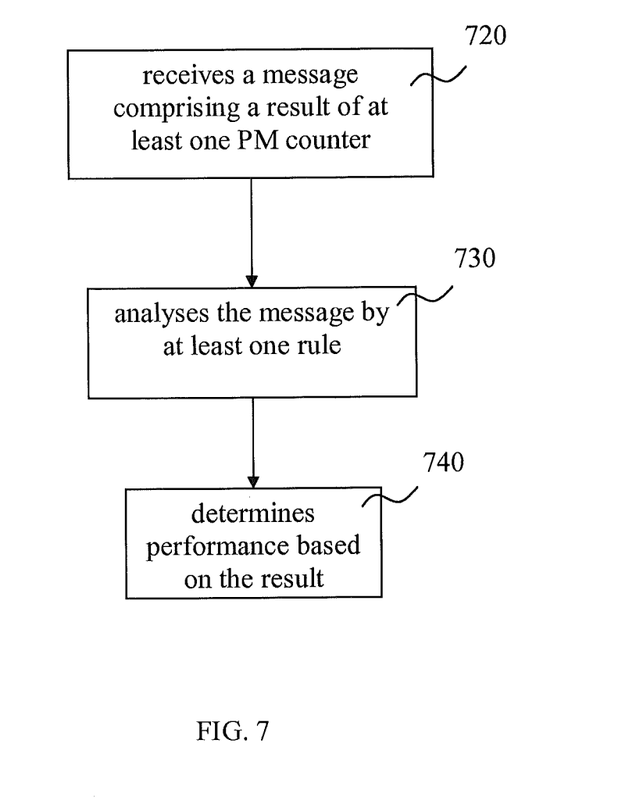
FIG. 7 shows a schematic overview of a flowchart of a method in an operation and maintenance communication device.

In FIG. 7, a general embodiment of the present solution is disclosed as a flowchart of a method in the O&M communication device 30. The method is for determining performance related to the communication device 20.

In step 720, the O&M communication device 30 receives a message comprising a result of at least one PM counter indicating occurrences of a PM parameter from the communication device 20.

In step 730, the O&M communication device 30 analyses the message by using at least one rule. The rule is used to determine that the PM parameter of the at least one PM counter is related to a single PM parameter defined within the O&M communication device 30.

In step 740, the O&M communication device 30 determines performance related to the communication device 20 based on the result received from the communication device 20 in relation to the single PM parameter.

Figure 8:
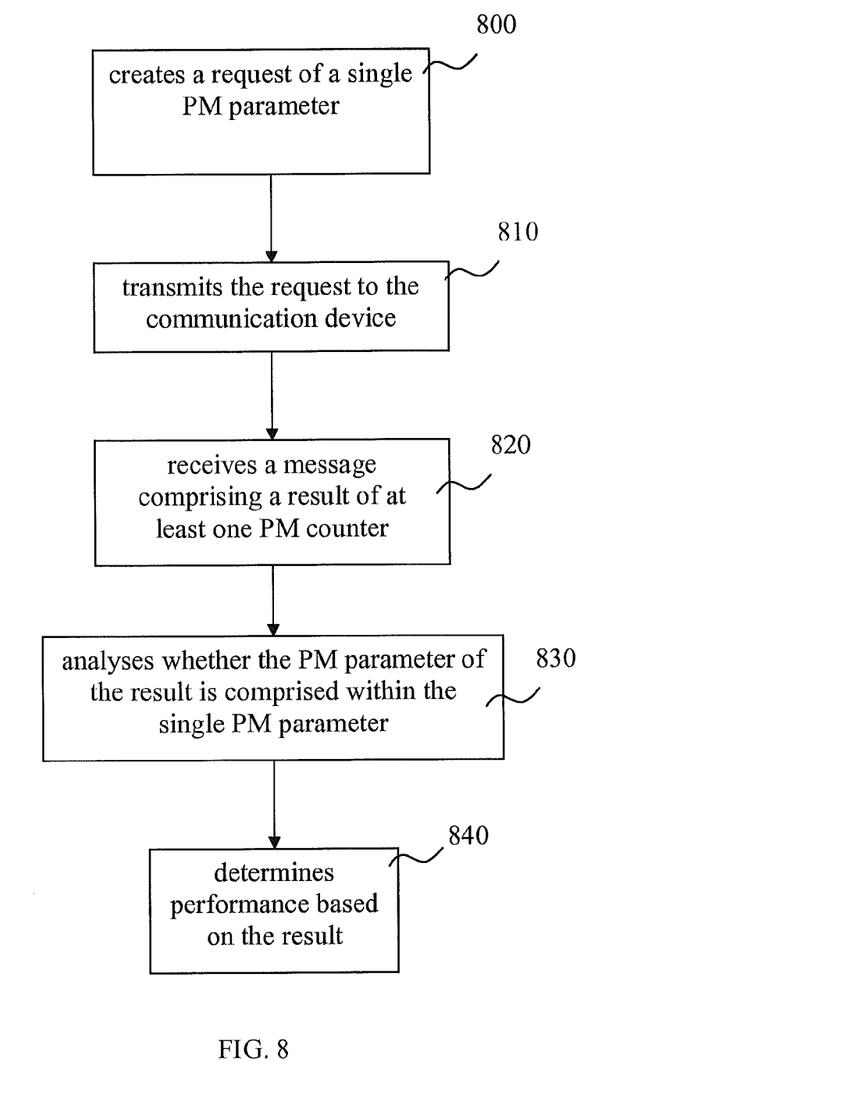
FIG. 8 shows a schematic overview of a flowchart of a method in an operation and maintenance communication device.

In FIG. 8, some embodiments of the present solution in the O&M communication device 30 discussed in relation to FIG. 7 are disclosed. The method is for the O&M communication device 30 to determine performance related to the communication device 20.

In step 800, the O&M communication device 30 creates a request for counting a single PM parameter of the communication device. This may be based on a command from an operator, according to a cyclic rule, based on indication from a neighbouring core communication device and/or the like. The single performance parameter is used to determine the performance related to the communication device 20. The single PM parameter may comprise connections per QCI, failure alarms of internal processes of the communication device 20 and/or the like In step 810, the O&M communication device 30 transmits the request to the communication device 20. In some embodiments, the request is transmitted over an O&M interface connection or the like, to the communication device 20. The request may be confirmed from the communication device 20.

In step 820, the O&M communication device 30 receives a message comprising a result of at least one PM counter indicating occurrences of a PM parameter from the communication device 20. The PM counter has been created at the communication device 20 in accordance with a rule activated by the request sent in step 810. It should here be understood that the result may indicate that no occurrences has been detected and counted at the communication device 20. The step 820 in FIG. 8 corresponds to step 720 in FIG. 7.

In step 830, the O&M communication device 30 analyses the message by using at least one rule. The rule is used to determine that the PM parameter of the at least one counter is related to the single PM parameter defined within the O&M communication device 30. The step 830 in FIG. 8 corresponds to step 730 in FIG. 7. Thereby, a more efficient and reliable way to perform performance analysis is provided.

In some embodiments, the analysing comprises to analyse the PM parameter of the PM counter and to compare the PM parameter to a predetermined rule/list/table whether the PM parameter is comprised within the single PM parameter to enable the determining of performance. For example, by using a rule stating that the definition of the PM counter, that is, the name of the PM counter, comprises a combination of a definition of the single PM parameter and the PM parameter that has been counted, the O&M communication device 30 will be able to determine, by analysing the name, whether the result relates to the single PM parameter. This will enhance performance analysis making the performance analysis more efficient and reliable when adding new PM parameters. For example, in the case of the PM parameter ERAB establishments of QCIs, there exist 256 QCIs, if one should add another QCI, the PM counter of that QCI would automatically be named pmErabEstablQCI257. Hence, there is no need to define the new PM parameters in the O&M communication device In step 840, the O&M communication device 30 determines performance related to the communication device 20 based on the result received from the communication device 20 in relation to the single PM parameter. The step 840 in FIG. 8 corresponds to step 740 in FIG. 7.

In a simplified example, the O&M communication device 30 receives results from a number of PM counters defined as pmDroppedERAB1, pmDroppedERAB4, and pmDroppedERAB36 indicating dropped connections of different ERABs. The O&M communication device then "transforms" the results of the different ERABs into a result of single PM parameter, that is, total dropped connections and determines the performance based on adding the different results into one result relating to the single PM parameter. It should be understood that if the O&M communication device 30 is interested of knowing which ERAB that is dropped the most, that is, the single PM parameter is which ERAB that is dropped the most, the results are compared to determine the single PM parameter.

Hence, the presented solution enables an efficient and reliable way to perform performance analysis within a radio telecommunications network.

Figure 9:
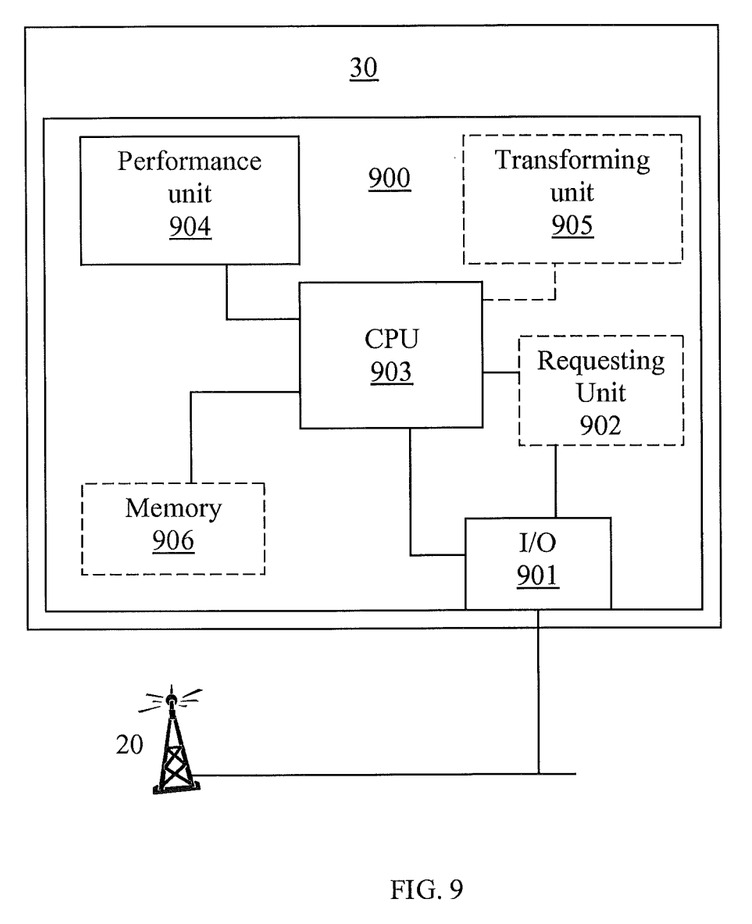
FIG. 9 shows a schematic overview of an operation and maintenance communication device comprising an arrangement.

To perform the method steps above for enabling the provision of PM data to be used in a performance analysis related to the communication device 20, the O&M communication device 30 comprises an O&M arrangement 900 depicted in FIG. 9.

The O&M arrangement 900 comprises a network interface unit (I/O) 901 arranged to receive a message comprising a result of at least one PM counter indicating occurrences of a PM parameter from the communication device 20.

In some embodiments, the O&M arrangement 900 comprises a requesting unit 902 arranged to create a request for counting a single PM parameter of the communication device 20. In these embodiments, the I/O 901 is further used to transmit the request to the communication device 20.

The O&M arrangement 900 further comprises a processing unit (CPU) 903 arranged to analyze the message by using at least one rule to determine that the PM parameter of the at least one counter is related to the single PM parameter defined within the O&M arrangement 900.

The O&M arrangement 900 further comprises a performance unit 904 arranged to determine performance of the communication device 20 based on the result received from the communication device 20 in relation to the single PM parameter.

In some embodiments, the O&M arrangement 900 comprises a transforming unit 905 arranged to transform the result of the PM counter to define a result related to the single PM parameter. The performance unit 904 is further arranged to determine performance related to the communication device 20 based on the transformed result. By letting the definition of the result comprise a name of the counted PM parameter it will be facilitated for the O&M arrangement 900 to determine what single PM parameter the result relates to.

The O&M arrangement 900 may further comprise a memory unit 906 to be used to store data regarding, for example, rules, definitions, and applications to perform the methods of this solution.

The memory unit 906 may comprise a single memory unit, a plurality of memory units, external and/or internal memory units.

The processing unit 903 may comprise a CPU (as illustrated), a single processing unit, a plurality of processing units, and or the like. It should also be understood that the request unit 902, processing unit 903, the performance unit 904, and the transforming unit 905 may all be parts of a processing unit/s.

In some implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method in a communication device of a communications network for enabling provision of data to be used in a performance analysis, the method comprising:
obtaining an input to set up at least one rule within the communication device, the rule being associated with creating at least one performance management counter to count occurrences of a performance management parameter related to the communication device;
setting up the at least one rule;
detecting an impulse;
determining whether the at least one rule has been satisfied based on the impulse;
monitoring data associated with the communication device if it is determined that the at least one rule has been satisfied;
creating the at least one performance management counter to count occurrences of the at least one performance management parameter detected in the monitored data; and
transmitting a message including a result of the at least one performance management counter to an operation and maintenance communication device.

2. The method of claim 1, wherein detecting the impulse further comprises
Receiving an impulse, wherein the impulse includes a request, from the operation and maintenance communication device, requesting the communication device to create a performance management counter for counting a single performance management parameter,
wherein the at least one rule states that if an impulse includes a request requesting a creation of a performance management counter of the single performance management parameter, a performance management counter should be created counting occurrences of a performance management parameter detected in the monitored data associated to the single performance management parameter.

3. The method of claim 2, wherein the message further comprises a definition of the performance management parameter that has been counted, the definition including a name, composed by combining a definition of the single performance management parameter and the performance management parameter that has been counted based on a predetermined rule.

4. The method of claim 1, wherein the performance management parameter comprises a core network identifier, evolved UMTS Terrestrial Radio Access Network (E-UTRAN) radio access bearer of a quality of service class identifier, international mobile subscriber identity, and/or mobile type.

5. The method of claim 1, wherein the monitored data comprises traffic served by the communication device.

6. The method of claim 1, wherein the monitored data comprises an internal process of the communication device.

7. The method of claim 1, wherein the impulse comprises at least one occurrence of a performance management parameter in received traffic or internal processes of the communication device.

8. The method of claim 1, wherein the at least one rule states to create a performance management counter to count occurrences of at least one performance management parameter in the monitored data that has occurred during a predetermined time period and/or a preset number of times.

9. The method of claim 1, wherein the at least one rule states that a performance management counter should be removed when an occurrence a performance management parameter of that performance management counter has not occurred in the monitored data during a predetermined time or occurred a number of times but the number is under a preset threshold during a predetermined time.

10. A method in an operation and maintenance communication device for determining performance related to a communication device, the method comprising:

receiving a message from the communication device including a result of at least one performance management counter, the result indicating occurrences of a performance management parameter;

analyzing the message by at least one rule for determining that the performance management parameter of the at least one performance management counter is related to a single performance management parameter defined within the operation and maintenance communication device;

performance related to the communication device based on the result received from the communication device in relation to the single performance management parameter if it is determined that the at least one performance management counter is related to the single performance management parameter;

creating a request of the single performance management parameter; and transmitting the created request to the communication device, wherein analyzing further comprises analyzing the performance management parameter of the performance management counter and comparing the performance management parameter to at least one of a predetermined list, rule and table to determine whether the performance management parameter is comprised within the single performance management parameter to enable the determining of the performance.

11. A communication device arrangement in a communication device, the communication device arrangement comprising:

an obtaining unit arranged to obtain an input to set up at least one rule within the communication device, the rule being associated with creating at least one performance management counter to count occurrences of a performance management parameter related to the communication device;

a processing unit arranged to set up the at least one rule;

a detecting unit arranged to detect an impulse, wherein the impulse is used by the processing unit to determine whether the at least one rule has been satisfied;

a monitoring unit arranged, if the at least one rule is satisfied, to monitor data associated to the communication device;

a counter unit arranged to create the at least one performance management counter to count occurrences of the at least one performance management parameter detected in the monitored data; and a network interface unit arranged to transmit a result of the at least one performance management counter within a message to an operation and maintenance communication device.

12. An operation and maintenance arrangement in an operation and maintenance communication device, the operation and maintenance arrangement comprising:

a network interface unit arranged to receive a message including a result of at least one performance management counter, the result indicating an occurrence of a performance management parameter from a communication device;

a processing unit arranged to analyze the message by at least one rule to determine whether the performance management parameter of the at least one performance management counter is related to a single performance management parameter defined within the operation and maintenance arrangement; and a performance unit arranged to determine performance related to the communication device based on the result in relation to the single performance management parameter if it is determined that the performance management parameter of the at least one performance management counter is related to the single performance management parameter, create a request of the single performance management parameter and transmit the created request to the communication device, wherein the processing unit if further configured to analyze the performance management parameter of the performance management counter and compare the performance management parameter to at least one of a predetermined list, rule and table to determine whether the performance management parameter is comprised within the single performance management parameter to enable the determining of the performance.

* * * * *